United States Patent [19]

Collins et al.

[11] Patent Number: 5,170,163

[45] Date of Patent: Dec. 8, 1992

[54] AIRCRAFT PERFORMANCE MONITORING

[75] Inventors: Philip H. Collins, Tewksbury; Robin D. T. Mosedale, Childswickham, both of England

[73] Assignee: Smiths Industries Public Limited Company, London, England

[21] Appl. No.: 652,622

[22] Filed: Feb. 8, 1991

[30] Foreign Application Priority Data

Feb. 17, 1990 [GB] United Kingdom ............... 9003653

[51] Int. Cl.$^5$ ............................................. G08B 23/00
[52] U.S. Cl. .................................... 340/967; 244/187; 244/196; 340/963; 364/428
[58] Field of Search ............... 340/963, 967, 970, 951; 244/181, 183, 186, 187, 191–193, 196; 73/178 T; 364/428, 430, 439, 433, 434

[56] References Cited

U.S. PATENT DOCUMENTS

| | | |
|---|---|---|
| 2,973,927 | 3/1961 | Miller et al. ........................ 244/181 |
| 3,051,416 | 8/1962 | Rotier .................................. 244/193 |
| 3,309,923 | 3/1967 | Bishop et al. ..................... 73/178 T |
| 3,521,229 | 7/1970 | Lepers et al. ..................... 340/967 |
| 3,523,664 | 8/1970 | Doniger et al. .................... 244/187 |
| 3,892,373 | 7/1975 | Doniger ............................. 244/186 |
| 4,357,661 | 11/1982 | Lambregts et al. ............... 244/187 |
| 4,589,070 | 5/1986 | Kyrazis ............................. 340/968 |

Primary Examiner—Jin F. Ng
Assistant Examiner—Brent A. Swarthout
Attorney, Agent, or Firm—Pollock, VandeSande and Priddy

[57] ABSTRACT

An aircraft performance monitor 1 receives signals representative of the height h, rate of change of height $\dot{h}$ and vertical acceleration $\theta$ of the aircraft. The monitor 1 determines when $(h - A(_{n1}{}^{n2}) + K_1\dot{h} + K_2\theta$ goes beyond a predetermined limit and generates a warning signal and disables the autopilot. The signal representative of vertical acceleration may be derived from the rate of change of pitch attitude of the aircraft, from the elevator angle or from an accelerometer.

9 Claims, 1 Drawing Sheet

AIRCRAFT PERFORMANCE MONITORING

BACKGROUND OF THE INVENTION

This invention relates to aircraft performance monitoring.

The invention is more particularly concerned with methods for monitoring the performance of an aircraft in the flare stage of descent to landing and for signalling departure of the aircraft from the desired flight profile.

Automatic landing of aircraft can be achieved using duplicated or triplicated redundancy autopilots. Simplex autopilots are not used for automatic landing, because failure of the autopilot at a critical stage could lead to fatal consequences. Duplicated and triplicated autopilots of the kind suitable for automatic landing are, however, too expensive for use in smaller aircraft.

BRIEF SUMMARY OF THE INVENTION

It is one object of the present invention to provide methods of monitoring the performance of an aircraft that can enable use of a simplex autopilot in automatic landing of the aircraft. It is another object of the present invention to provide methods of monitoring performance of an aircraft during a landing phase, whether under manual control, simplex autopilot or multiple redundant autopilot control.

According to one aspect of the present invention there is provided aircraft equipment for monitoring performance of an aircraft during the flare stage of landing including means for providing a first signal representative of height (h) of the aircraft above ground, means for providing a second signal representative of rate of change of height (h), and means for providing a third signal ($\theta$) related to vertical acceleration of the aircraft, the equipment being arranged to determine when an expression including the terms $(h-A)_{n_1}{}^{22} + K_1 h + K_2 \theta$ goes beyond a predetermined limit and to provide an output signal in accordance therewith.

The expression may include an additional term $K_4 \eta$ where $\eta$ is representative of rate of change of elevator angle.

The third signal may be representative of the rate of change of pitch attitude of the aircraft. The third signal $\theta$ may be derived from the elevator angle $\eta$, an accelerometer or by differentiating the second signal.

The equipment may include a filter that amalgamates a pitch rate signal with an output from a vertical accelerometer, the output of the filter being used to provide the third signal.

Alternatively, the equipment may include a filter that amalgamates an elevator rate signal with an output from a vertical accelerometer, the output of the filter being used to provide the third signal.

The equipment may be arranged to determine if the pitch attitude ($\theta$) of the aircraft goes beyond a predetermined limit below predetermined heights, the equipment being arranged to provide an output signal in accordance therewith.

The means for providing the first signal may include a radar altimeter. The output signal may be supplied to a warning device and, or alternatively, to disable the aircraft autopilot. The autopilot may be a single lane autopilot.

According to another aspect of the present invention there is provided a method of monitoring performance of an aircraft during the flare stage of landing including the steps of deriving a first signal representative of height (h) of the aircraft above ground, deriving a second signal representative of rate of change of height (h), deriving a third signal ($\theta$) related to vertical acceleration of the aircraft, determining when the expression including the terms $(h-A)_{n_1}{}^{n_2} + K_1 h + K_2 \theta$; goes beyond a predetermined limit, and providing an output signal in accordance therewith.

Aircraft equipment that operates in accordance with the methods of the present invention, will now be described, by way of example, with reference to the accompanying drawings.

DETAILED DESCRIPTION OF THE PREFERRED EMBODIMENT

Figure 1:
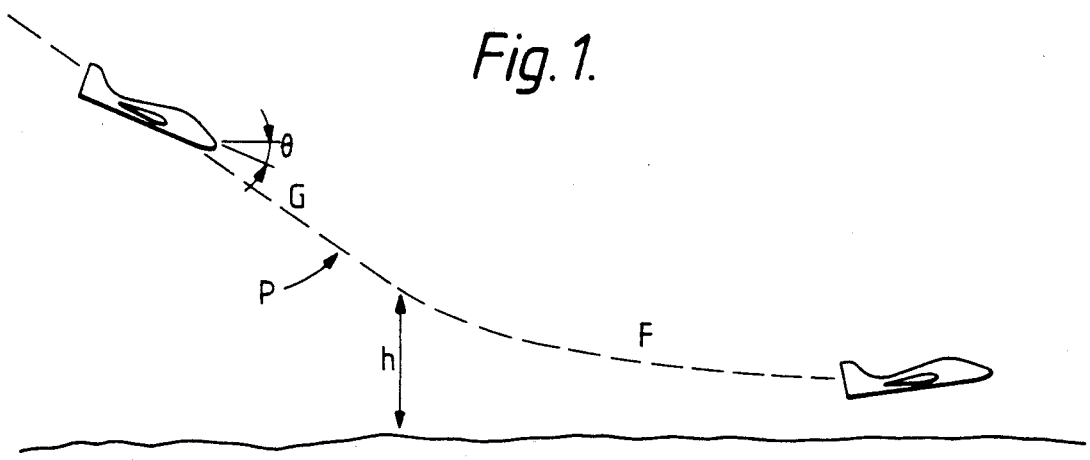
FIG. 1 illustrates a typical flight profile of an aircraft during landing.
Figure 2:
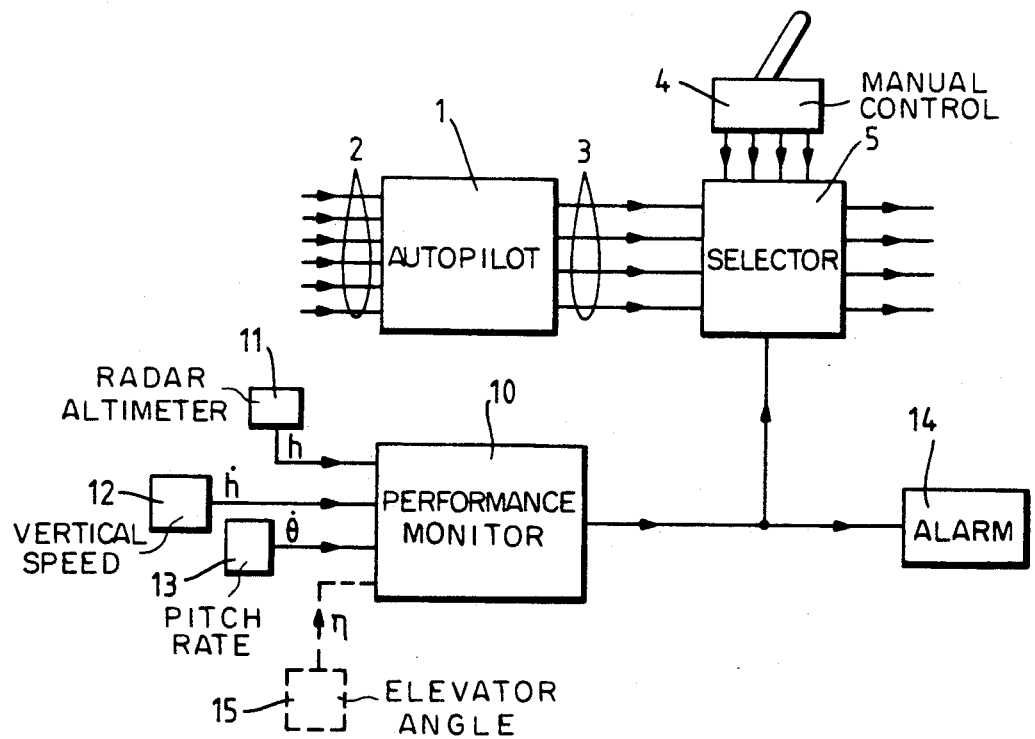
FIG. 2 is a schematic diagram showing the equipment.

With reference first to FIG. 1, the flight profile of an aircraft when descending to land is typically as shown by the line P. Initially, the flight profile is a relatively steep glide path G during which the pitch attitude $\theta$ is very small or negative, that is, the aircraft is inclined just above or just below the horizontal. As the aircraft approaches the ground, the pilot or autopilot raises the nose of the aircraft so that the pitch attitude increases and the flight profile flattens. This is the flare stage F in which the rate of descent of the aircraft is reduced and the aircraft is put in the correct attitude for landing.

In the present example, the aircraft includes a single-lane or simplex autopilot 1 which receives various inputs on lines 2 such as representative of the speed, attitude and height of the aircraft. The autopilot 1 is of entirely conventional construction and operates to provide output control signals on lines 3 which effect control of various aircraft functions so as to ensure that it follows the desired flight profile P as closely as possible. A manual control 4 is also provided via a selector unit 5 so that the pilot can overide operation of the autopilot 1 when desired. As so far described, the system is entirely conventional.

The aircraft also includes novel performance monitoring equipment 10. The equipment 10 receives outputs from a radar altimeter 11 representative of the height h of the aircraft above ground, from a vertical speed reference unit 12 representative of the vertical speed h of the aircraft, and from a pitch rate sensor 13 representative of the pitch rate $\theta$ of the aircraft. Alternatively, the vertical speed h could be derived by differentiating the height input h, and the pitch rate $\theta$ derived by differentiating the pitch angle $\theta$ within the monitor 10. These inputs could be derived from the same sources as provide the equivalent inputs to the autopilot 1, but it is preferable to use independent sources, so as to provide a check on the operation of the sources supplying the autopilot.

The equipment 10 carries out a calculation of the following general form on the inputs:

$$(h-A)_{n_1}{}^{n_2} + K_1 h + K_2 \theta \qquad (1)$$

where A is a constant or zero; $n_1$ and $n_2$ define the minimum and maximum values of $h-A$; and $K_1$ and $K_2$ are constants.

For a Hawker Siddley 748 aircraft, the expression (1) is as follows:

$$(h-8)_o^{4o} + 3.2h + 9.5\theta \tag{2}$$

The equipment 10 then computes whether the value of the expression (1) or (2) is less than a predetermined limit value C. For expression (2) the value C is −16 feet. If the value falls below this limit, the monitor 10 supplies a signal to the selector 5 to disconnect the autopilot 1 from control of the aircraft so that this is returned to manual control. A visual or audible warning is also provided to the pilot by an alarm unit 14. The aircraft is preferably deliberately trimmed nose light, that is, with a slight nose-up attitude, the autopilot 1 normally providing a counteracting trim force against this out of trim condition of the aircraft. In this way, when the autopilot is disconnected in a descent mode, the trim of the aircraft causes the nose of the aircraft to be raised before there is any intervention by the pilot.

The constants in the expression (1) will be different for different aircraft and can be determined by a combination of analytical and empirical investigations. It can be seen that the first term in the expression (2) will have the value 40 for any height h above 48 feet; when the height h is 8 feet or less, this term will be zero. The third term in the expression will be zero when the pitch attitude of the aircraft is constant. It can be seen that, for a height of 8 feet or less and a constant pitch attitude, the autopilot 1 will remain in control of the aircraft as long as the vertical speed h of the aircraft is not more than $-5$ ft sec$^{-1}$, that is 5 ft sec$^{-1}$ in a downward direction. If, however, the rate of descent is greater than this, the expression (2) will become less than $-16$ ft and the performance monitor 10 will cause the autopilot 1 to be disconnected. If, however, the rate of descent is greater than $-5$ ft sec$^{-1}$ but the nose of the aircraft is being raised by the pilot, so as to produce a positive pitch attitude rate, that is, a vertical acceleration in an upward direction, to reduce the rate of descent, the third term in the expression will become non-zero and will prevent disconnect of the autopilot 1. At heights above 8 feet, the first term of the expression will also provide a contribution. The effect of this term is that, at heights between 40 ft and 8 ft, a higher rate of descent is permitted before the warning is triggered. This is permissible because the higher the point of disconnect, the more time is available to the pilot to recover the situation. It can be seen from this, that the performance monitor 10 will detect if the aircraft's rate of descent is too great for its height and no remedial action is being taken by the autopilot or pilot to correct for this by altering the pitch attitude of the aircraft.

The third term $K_2\theta$ in the expression (1) is related to the vertical acceleration (including negative acceleration or deceleration) of the aircraft and could be derived in other ways than from the aircraft pitch angle $\theta$. For example, it could be derived from an accelerometer, or by differentiating the vertical speed h. Alternatively, or additionally, a signal could be derived from a transducer 15 fitted to the aircraft elevator, or elevator control, because movement of the elevator would result in change in pitch attitude of the aircraft. It can be seen, therefore, that the third term in the expression may not directly represent the present vertical acceleration of the aircraft but could provide an indication of likely future acceleration. In particular, where the third term is derived from rate of change of pitch attitude $\theta$, it can be seen that, because of lag in the performance of the aircraft, there will be a time interval before this actually results in a change in vertical acceleration. The signal, therefore, anticipates vertical accelerations resulting from changes of pitch attitude. Similarly, if this third term were derived from the elevator angle $\eta$, the time interval before a change in elevator angle produced a change in acceleration would be even greater, because of the additional lag between change in elevator angle and change in pitch attitude.

If an accelerometer were used, it would directly measure vertical acceleration, in particular, it would measure externally impressed acceleration due to atmosphere conditions (turbulence and windshear).

The expression (1) could include an additional, fourth term $K_3\dot\theta$ where $K_3$ is a constant and $\eta$ is the rate of change of elevator angle. Ideally, a filter could be constructed amalgamating the pitch rate or elevator rate signals (which anticipate accelerations resulting from aircraft manoeuvres) with a vertical accelerometer signal which would respond to atmospheric disturbances. The output of the filter would be used to provide the third term in the expression.

The performance monitor 10 provides a check on the performance of the aircraft and hence on the autopilot 1. This, therefore, enables a simplex, or single-lane autopilot to be used safely, because it would immediately be disconnected if the aircraft were to depart from a safe flight profile during flare. The performance monitor 10 could be included as a part of an autopilot and could also be used to monitor performance of an aircraft having duplex or triplex autopilot control. When used with a duplex autopilot, or triplex autopilot which has been reduced to duplex, the output of a modified form of performance monitor could be utilized by the autopilot to determine which is the remaining good lane of the autopilot which should be used to control operation of the aircraft. For example, an output from the monitor 10 indicative of departure of the aircraft from the desired flight profile could indicate which of the autopilot lanes is taking the correct action and disconnect the opposing lane.

The performance monitor 10 could carry out additional checks. For example, an autopilot disconnect, or warning, signal could be produced if the pitch attitude angle $\theta$ of the aircraft exceeded predetermined limits below a predetermined height. More particularly, the disconnect or warning signal would be generated if the nose of the aircraft were too far down for its height. Similarly, a disengage or warning signal could be produced if the nose down pitch rate $\dot\theta$ exceeded a predetermined limit.

The performance monitor 10 could also be used in manually-controlled aircraft which do not have any autopilot. In these applications, the output signal of the monitor would be solely an alarm signal to an alarm unit such as 14, notifying the pilot that remedial action should be taken to return the aircraft to the desired flight profile.

What we claim is:

1. A method of monitoring performance of an aircraft during the flare stage of landing under autopilot control, including the steps of: deriving a first signal representative of height (h) of the aircraft above ground; deriving a second signal representative of rate of change of height (h); deriving a third signal ($\theta$) related to vertical acceleration of the aircraft; determining when the expression including the terms $(h-A)_{n_1}{}^{n_2} + K_1 h + K_2\theta$ goes beyond a predetermined limit, where A is a height constant, $n_1$ is a minimum value of $(h-A)$ which replaces the value of $(h-A)$ in the expression when $(h-A)$ falls below $n_1$, $n_2$ is a maximum value of $(h-A)$ which replaces $(h-A)$ in the expression when $(h-A)$ rises above $n_2$, and $K_1$ and $K_2$ are constants; and providing an output signal in accordance therewith to disable the autopilot.

2. A method of monitoring performance of an aircraft during the flare stage of landing under pilot control, including the steps of: deriving a first signal representative of height (h) of the aircraft above ground; deriving a second signal representative of rate of change of height (h); deriving a third signal ($\theta$) related to vertical acceleration of the aircraft; determining when the expression including the terms $(h-A)_{n_1}{}^{n_2} + K_1\dot{h} + K_2\theta$ goes beyond a predetermined limit, where A is a height constant, $n_1$ is a minimum value of $(h-A)$ which replaces the value of $(h-A)$ in the expression when $(h-A)$ falls below $n_1$, $n_2$ is a maximum value of $(h-A)$ which replaces $(h-A)$ in the expression when $(h-A)$ rises above $n_2$, and $K_1$ and $K_2$ are constants; and providing an output signal in accordance therewith to an alarm unit to alert the pilot of deviation from the desired flight profile.

3. A method according to claim 1 or 2 wherein the expression includes an additional term $K_4\eta$ which is added to the other terms in the expression, where $\eta$ is representative of rate of change of elevator angle and $K_4$ is a constant.

4. A method according to claim 1 or 2, wherein the third signal is representative of rate of change of pitch attitude of the aircraft.

5. A method according to claim 1 or 2, wherein the third signal ($\theta$) is derived from the elevator angle $\eta$.

6. A method according to claim 1 or 2 wherein the third signal ($\theta$) is derived from an accelerometer.

7. A method according to claim 1 or 2 wherein the third signal is derived by differentiating the second signal.

8. A method according to claim 1 or 2 wherein the third signal is provided by amalgamating in a filter an output of a vertical accelerometer and a pitch rate signal.

9. A method according to claim 1 or 2 wherein the third signal is provided by amalgamating in a filter an output of a vertical accelerometer and an elevator rate signal.

* * * * *